United States Patent Office 3,142,616
Patented July 28, 1964

3,142,616
CONTROLLING MICROORGANISMS EMPLOYING SULFONYLACETONITRILES
Don R. Baker, Pinole, and Thomas B. Williamson, Santa Clara, Calif., assignors to Stauffer Chemical Company, New York, N.Y., a corporation of Delaware
No Drawing. Filed Jan. 8, 1962, Ser. No. 164,976
6 Claims. (Cl. 167—22)

This invention relates to new compositions of matter and their use as pesticides.

More particularly, the present invention involves compositions of the following general formula:

$$R-SO_2CCl_2CN$$

wherein R is selected from the groups consisting of alkyl, phenyl, substituted phenyl, benzyl and dichloroacetonitrile.

The compounds of the present invention can be made by chlorinating the corresponding sulfonyl acetonitriles using calcium hypochlorite.

$$R-SO_2CH_2CN + Ca(OCl)_2 \rightarrow R-SO_2CCl_2CN + Ca(OH)_2$$

The following examples show in greater detail the process for obtaining the compounds of the present invention.

*Example 1.—R–3804, Sulfone-Bis-Dichloroacetonitrile*

Sulfone-bis-acetonitrile (7.3 g., 0.005 mole) and glacial acetic acid (300 ml.) were mixed together and to the mixture was added 70% calcium hypochlorite (30 g., 0.15 mole) over a period of 45 minutes with stirring and cooling maintaining the reaction temperature at 15–20° C. After the addition was complete stirring was continued for one hour at 20° C. and the mixture then poured into 800 ml. of water and the resulting precipitate filtered off, washed with water and dried in vacuo to yield 12 g. of sulfone-bis-dichloroacetonitrile (94% yield).

Analysis.—Calc.: Cl, 50.2%; N, 4.95%. Found: Cl, 51.7%; N, 4.25%.

*Example 2.—R–4338, Ethylsulfonyldichloroacetonitrile*

To the solution of the ethylsulfonylacetonitrile (12 g., 0.09 mole) in glacial acetic acid (300 ml.) was added 70% calcium hypochlorite (30 g., 0.15 mole) in small portions over a period of 10 minutes below 20° C. with ice cooling and stirring. The mixture was then allowed to stir at 20–23° C. for one hour. The mixture was poured into 1000 ml. of water and the mixture extracted with chloroform (2 x 200 ml.). The chloroform extract was dried over magnesium sulfate and evaporated in vacuo to yield 17 g. of colorless oil as the product. (93% crude yield) $n_D^{30}$ 1.4609.

*Example 3.—R–4349, Benzylsulfonyldichloroacetonitrile*

To the solution of benzylsulfonylacetonitrile (12.2 g., 0.075 mole) in glacial acetic acid (300 ml.) was added 70% calcium hypochlorite (30 g., 0.15 mole) over a period of 10 minutes with stirring and cooling maintaining the reaction temperature at 20–25° C. The mixture was then stirred for 3 hours and next poured into 750 ml. of water. The resulting precipitate was filtered off, washed with water and dried in vacuo to yield 10 g. of benzylsulfonyldichloroacetonitrile (51% yield) M.P. 100–106° C.

Analysis.—Calc.: Cl, 26.8%; S, 12.1%; N, 5.3%. Found: Cl, 26.8%; S, 12.2%; N, 4.8%.

*Example 4.—R–5166, Methylsulfonyldichloroacetonitrile*

To the solution of the methylsulfonylacetonitrile (10 g., 0.084 mole) in glacial acetic acid (300 ml.) was added 70% calcium hypochlorite (30 g., 0.15 mole) over a period of 10 minutes below 20° C. with ice cooling and stirring. The mixture was then allowed to stir for 1 hour. This mixture was next poured into 1000 ml. of water and extracted with chloroform (2 x 200 ml.). The combined chloroform extracts were dried over magnesium sulfate and evaporated in vacuo to yield a light yellow oil which on standing crystallized. This was diluted with 25 ml. of cyclohexane as crystallization proceeded. The resulting crystals were filtered off, washed with cyclohexane and dried in vacuo to yield 13 g. of crystals (82% yield) of methylsulfonyldichloroacetonitrile, M.P. 82–83° C.

Analysis.—Calc.: Cl, 37.7%; S, 17.1%. Found: Cl, 37.6%; S, 17.0%.

The compounds of the present invention were tested as will be described hereinafter to show their fungicidal and bactericidal properties.

*In vitro test.*—This test measures the fungicidal and bactericidal properties of a chemical when in contact with a growing fungus or bacterium in an artificial medium.

The compound is placed in three vials of malt broth at the rate of 50 p.p.m. Next, water suspensions of spores *Aspergillus niger,* Pencillium sp., and cells of *Escherichia coli* are added (one organism per vial). One week later results are read. If no growth is observed, the test is repeated using lower concentrations of the compound being tested to determine the lowest concentration that can be used and still control growth of the organism.

*Soil mix test.*—This test indicates whether or not a compound is active against soil-borne pathogenic fungi. Two fungi are used and tested separately, *Rhizoctonia solani* and *Fusarium solani.* The compound being tested is pipetted into fungus infested soil at a rate of 110 p.p.m., mixed, and then dumped into paper containers. Cotton is planted into *Rhizoctonia solani* infested and treated soil and beans into *Fusarium solani* infested and treated soil. Three to four weeks later plants are inspected for disease symptoms. If none or oly mild symptoms are present, the test is rerun using lower concentrations of the compound being tested.

The following table shows the results of the above mentioned tests on some of the compounds of the present invention.

| Compound Number | R–SO₂CCl₂CN, wherein R is— | Concentration for control in p.p.m. | | | | |
|---|---|---|---|---|---|---|
| | | In Vitro test | | | Soil Mix Test | |
| | | A. niger | Penicillium | E. coli | Rhizoctonia | Fusarium |
| R-5166 | CH₃– | >50 | >50 | ¹ 50 | (55) | ¹ (7) |
| R-4338 | C₂H₅– | >50 | >50 | 25 | ¹ (27) | ¹ (2.5) |
| R-5391 | n-C₃H₇– | >50 | ¹ (50) | >50 | ¹ 110 | ¹ 110 |
| R-4344 | n-C₄H₉– | >50 | >50 | 25 | ¹ (27) | ¹ (7) |
| R-4345 | CH₃(CH₂)₇– | ¹ 50 | ¹ (50) | >50 | >110 | 55 |
| R-4337 |  | >50 | ¹ (50) | 25 | ¹ (27) | 55 |
| R-4336 | CH₃–– | (25) | (25) | >50 | >110 | (13) |
| R-4117 | Cl–– | ¹ 50 | ¹ (50) | 25 | ¹ (13) | 27 |
| R-4349 | –CH₂– | >50 | >50 | >50 | ¹ (27) | 55 |
| R-3804 | NCCl₂C– | ¹ 5 | ¹ 5 | 25 | ¹ 110 | ¹ 27 |

¹ Lowest concentration tested.
Numbers in parentheses indicate partial control at noted p.p.m.

The examples given in the foregoing specification are merely illustrative of the present invention and should not be considered as limiting the scope thereof. The scope of the present invention is intended to be limited only by the claims appended hereto.

We claim:
1. A method of effectively controlling microorganisms selected from the class consisting of bacteria and fungi comprising contacting said microorganisms with an effective amount of a compound of the formula, R—SO₂CCl₂CN, wherein R is selected from the group consisting of alkyl, phenyl, alkyl substituted phenyl, halo-substituted phenyl benzyl and dichloroacetonitrile.
2. A method as stated in claim 1 wherein R is dichloroacetonitrile.
3. A method as stated in claim 1 wherein R is ethyl.
4. A method as stated in claim 1 wherein R is methyl.
5. A method as stated in claim 1 wherein R is n-propyl.
6. A method as stated in claim 1 wherein R is p-chlorophenyl.

References Cited in the file of this patent
UNITED STATES PATENTS

| | | |
|---|---|---|
| 2,762,836 | Selcer | Sept. 11, 1956 |
| 2,775,612 | Comte | Dec. 25, 1956 |
| 2,919,224 | Heininger | Dec. 29, 1959 |
| 2,919,225 | Heininger | Dec. 29, 1959 |
| 3,000,927 | Birum | Sept. 19, 1961 |
| 3,017,321 | Hardy | Jan. 16, 1962 |
| 3,050,545 | Heininger | Aug. 21, 1962 |
| 3,063,894 | Heininger | Nov. 13, 1962 |

FOREIGN PATENTS

| | | |
|---|---|---|
| 191,447 | Germany | June 15, 1937 |